June 30, 1959 H. W. DEMLER 2,892,368

CRIMPING TOOL

Filed May 1, 1956 8 Sheets-Sheet 1

INVENTOR.
Henry W. Demler
BY
Curtis Morris & Safford

June 30, 1959 H. W. DEMLER 2,892,368

CRIMPING TOOL

Filed May 1, 1956 8 Sheets-Sheet 2

INVENTOR.
Henry W. Demler
BY
Curtis Morris & Safford

June 30, 1959 H. W. DEMLER 2,892,368

CRIMPING TOOL

Filed May 1, 1956 8 Sheets-Sheet 3

INVENTOR.

Henry W. Demler

BY

Curtis, Morris & Safford

INVENTOR.
Henry W. Demler
BY
Curtis, Morris + Safford

June 30, 1959 H. W. DEMLER 2,892,368

CRIMPING TOOL

Filed May 1, 1956 8 Sheets-Sheet 5

INVENTOR:
HENRY W. DEMLER
BY
Curtis Morris & Safford
ATTORNEYS

June 30, 1959 H. W. DEMLER 2,892,368

CRIMPING TOOL

Filed May 1, 1956 8 Sheets-Sheet 6

INVENTOR:
HENRY W. DEMLER
BY
Curtis, Morris & Safford
ATTORNEYS.

June 30, 1959 H. W. DEMLER 2,892,368

CRIMPING TOOL

Filed May 1, 1956 8 Sheets-Sheet 7

INVENTOR:
HENRY W. DEMLER
BY
Curtis Morris + Safford
ATTORNEYS

June 30, 1959 H. W. DEMLER 2,892,368

CRIMPING TOOL

Filed May 1, 1956 8 Sheets-Sheet 8

INVENTOR
HENRY W. DEMLER
BY
Curtis, Morris & Safford
ATTORNEYS.

United States Patent Office 2,892,368

Patented June 30, 1959

2,892,368

CRIMPING TOOL

Henry W. Demler, Palmyra, Pa., assignor to AMP Incorporated, a corporation of New Jersey Application May 1, 1956, Serial No. 581,936

10 Claims. (Cl. 81—15)

This invention relates to tools used for crimping connectors, terminals and the like to one or more electrical conductors. This application constitutes a continuation-in-part of my copending applications Serial Nos. 399,978 and 457,085, filed respectively on December 23, 1953, and September 20, 1954, both of which are now abandoned.

The crimped type of electrical connection, sometimes referred to as a "solderless" connection, has found widespread industrial acceptance, particularly during the past decade. Such a connection is far simpler to produce than by soldering or other prior techniques, and additionally, due to the intimate cold-forging of the metals, often provides a contact having less electrical resistance and increased stability. The pressure-formed types of connection have, for these and other reasons, found many and varied applications, for example they have been used extensively in the production of aircraft where numerous different equipment inter-connections must be made in a short time by a relatively untrained crew. It may readily be understood, therefore, that tools used to form a crimp must be easy to handle, predominantly foolproof, and advantageously are adapted for use with a range of connector or terminae sizes.

Crimping tools embodying the present invention may be constructed in a variety of forms to accommodate numerous different types of connectors, terminals and the like. However, for the purpose of showing fully the nature and characteristics of this invention, two hand-tools adapted for use with a particular class of such connectors and terminals will be described in detail herein. It is to be understood, of course, that this disclosure is for the purpose of instructing others skilled in the art so that they may be able to modify the details of construction in a manner best suited to particular applications, and is not to be considered as limiting the scope of the invention except as may be required by the prior art.

A properly designed crimping tool is adapted to translate the available primary energy into extremely high crimping pressures throughout the region of contact with the terminal or connector. For fixed installations, it is possible to use power-operated tools, and there the required high pressure may be obtained hydraulically, etc. For some applications, however, power-operated tools are unsuitable, as where the connection must be made in a confined space. In these cases, it is necessary to employ a hand-operated tool.

A special problem with crimping tools results from the fact that the high crimping pressures involved tend to distort the load-bearing members of the tool, thus producing imperfect crimps. This is particularly true where connectors of different sizes or types are crimped by the same tool, since the extent of distortion and hence the quality of the crimp will vary with the size, configuration or material of the connector being crimped. In prior tools, attempts have been made to alleviate this difficulty by using load-bearing members of substantial size and weight, to increase their resistance to distortion, but this expedient has not satisfactorily solved the problem and furthermore the weight of such tools makes them unsatisfactory for manual operation.

It is an object of the present invention to provide a crimping tool which is superior to crimping tools provided heretofore. A further object of this invention is to provide a crimping tool wherein distortion of the load-bearing members is minimized so as to assure consistently complete and accurate crimps. It is a further object of this invention to provide a tool capable of applying extremely high crimping pressures to connectors, terminals and the like, and which is yet small in size, light in weight, readily operable with one hand, and sturdily rigid. A still further object of this invention is to provide a tool construction that is efficient in operation yet economical to manufacture. Another object of this invention is to provide a tool of the type described and adapted to crimp a wide range of connector sizes. It also is an object of this invention to provide a manually-operable crimping tool having an efficient linkage mechanism.

Other objects, aspects and advantages of the invention will be partly pointed out in, and partly apparent from, the following description of two embodiments of the invention considered together with the accompanying drawings, in which.

Figure 9:
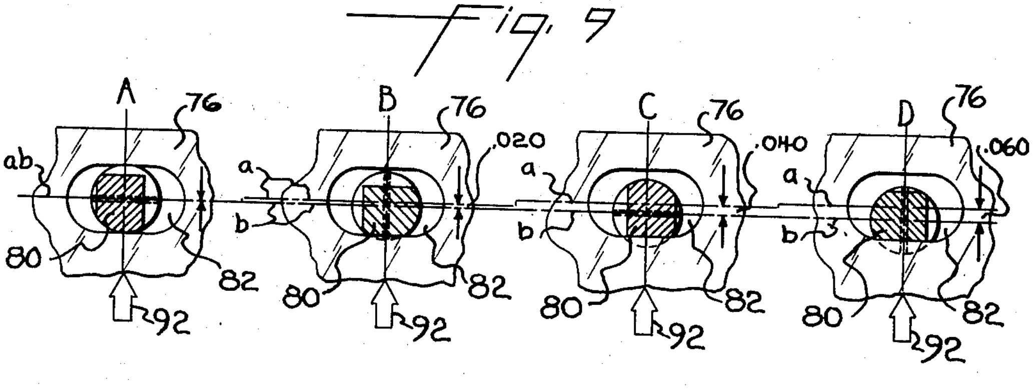
Figures 10, 11, 12:
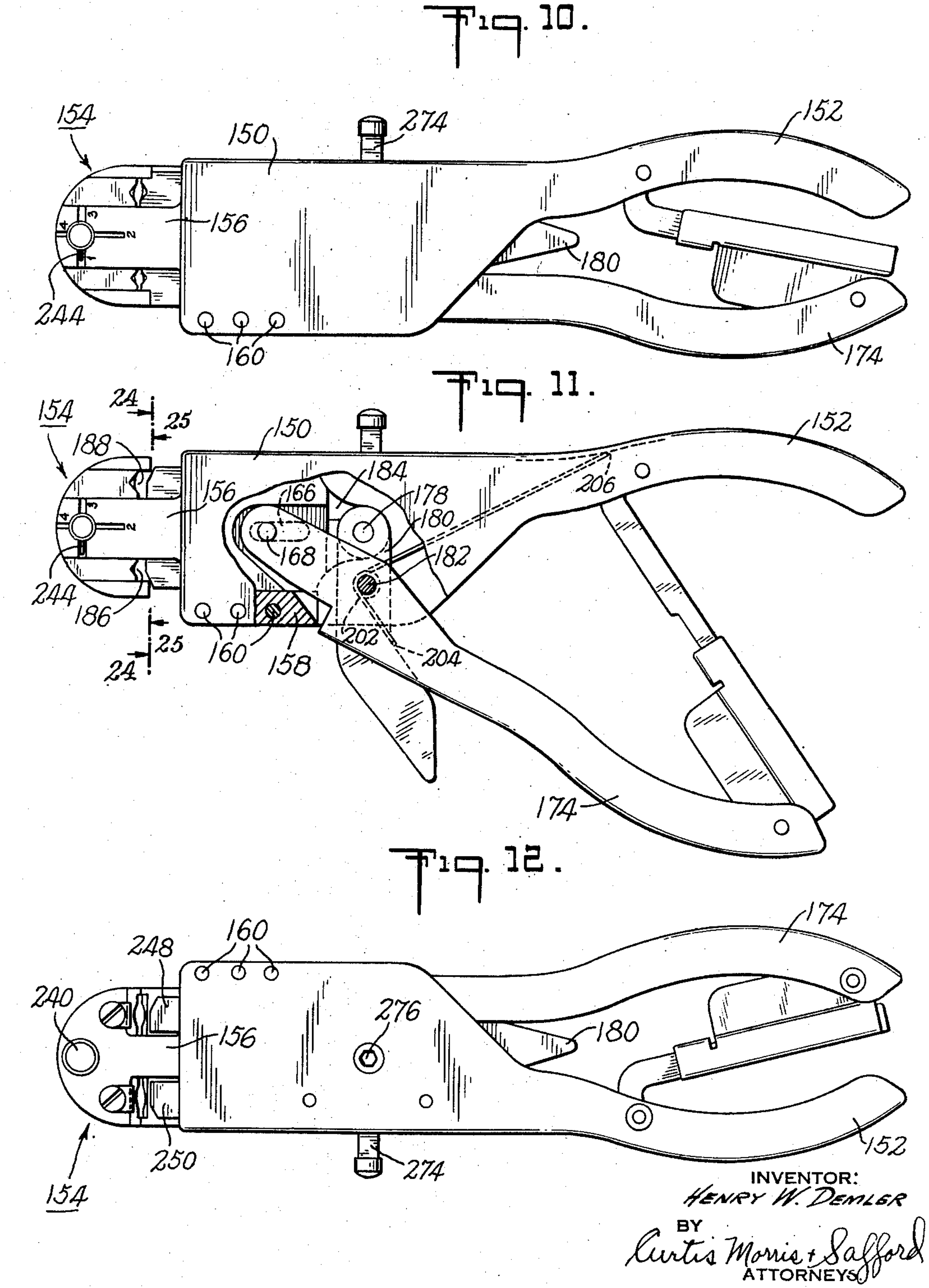
Figures 13, 14, 15:
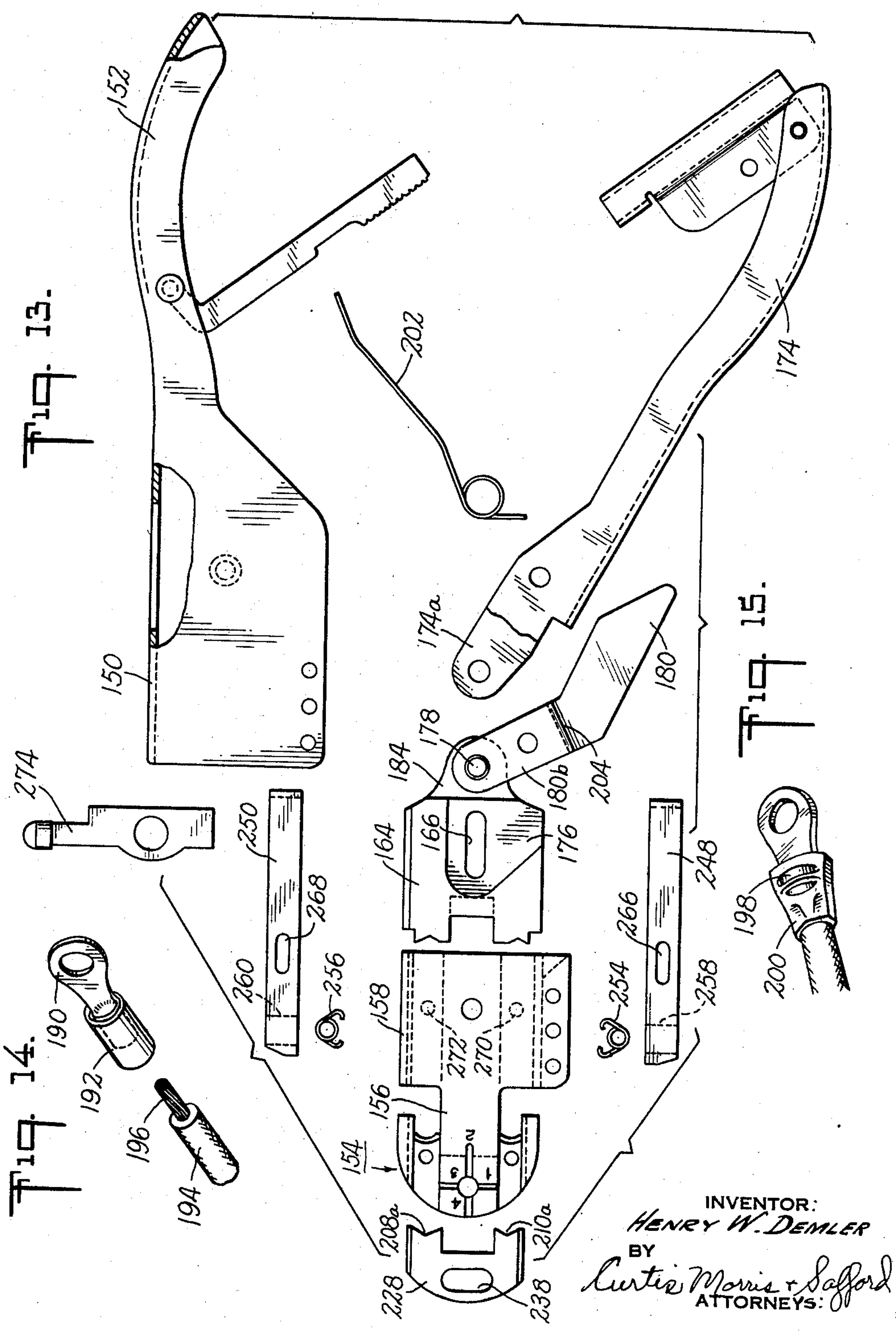
Figure 16:
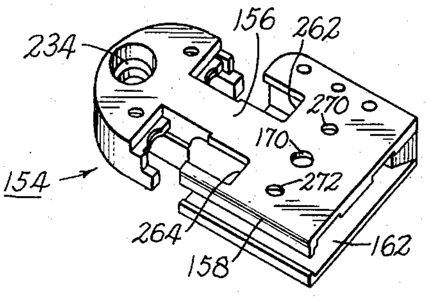
Figure 17:
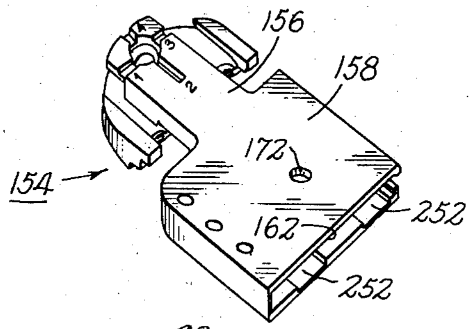
Figure 18:
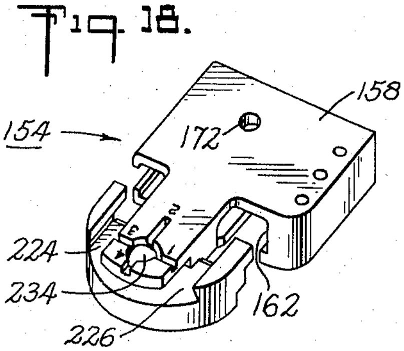
Figure 19:
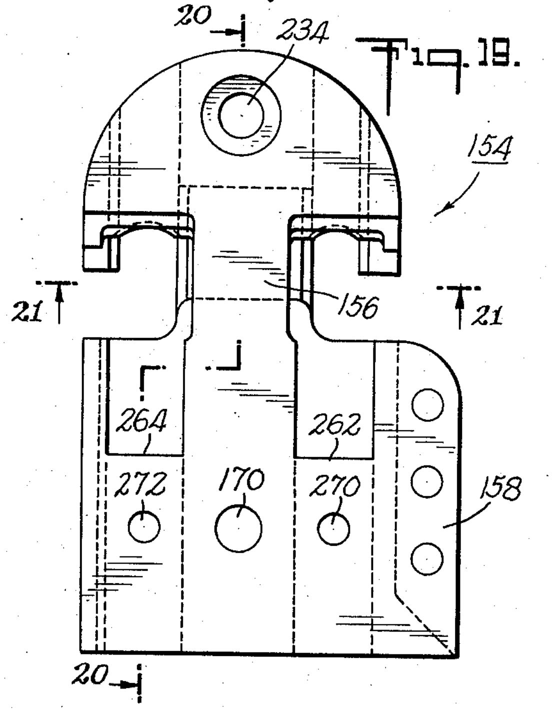
Figure 20:
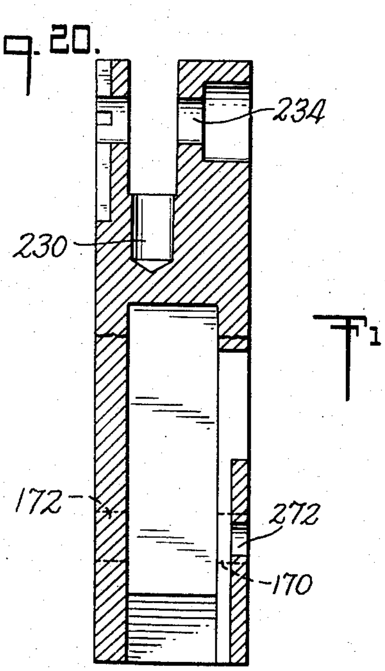
Figure 21:
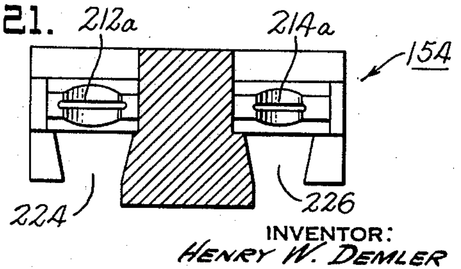
Figures 22, 23:
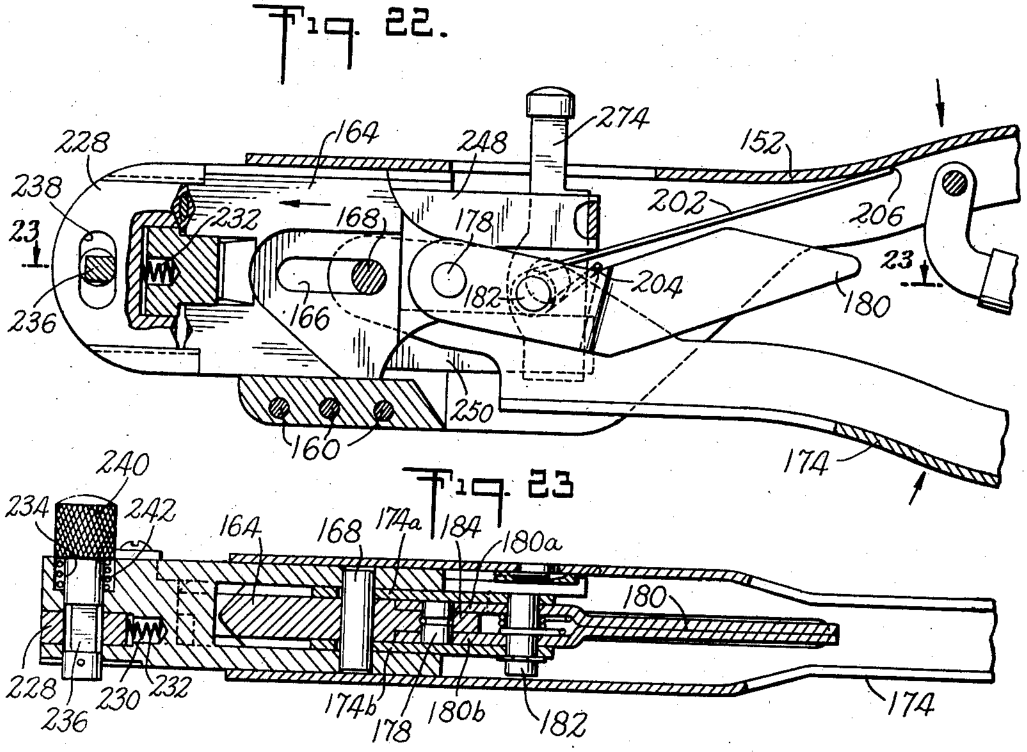
Figure 24:
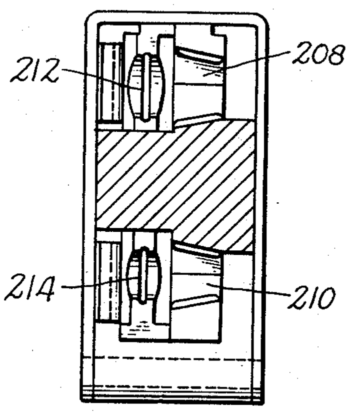
Figure 25:
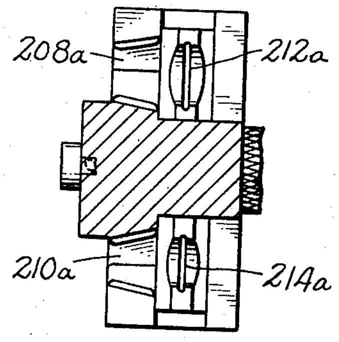

Figure 9 comprises four detail views showing various conditions of adjustment of the die-spacing mechanism;

Figure 10 is a side elevation of a modified hand tool, in closed position, showing the general arrangement of the crimping head and handles;

Figure 11 is a side elevation of the tool of Figure 10 in open position, and partly broken away to show the internal linkage mechanism for driving the movable plunger;

Figure 12 is a reverse side elevation of the tool shown in Figure 10;

Figure 13 is an exploded view of the tool of Figure 10, showing the principal components thereof;

Figure 14 illustrates an uncrimped terminal;

Figure 15 illustrates a crimped terminal;

Figures 16, 17 and 18 are various perspective views of the crimping head of the tool shown in Figure 10;

Figure 19 is an enlarged detail side elevation of the crimping head of the tool shown in Figure 10;

Figure 20 is a longitudinal section, partly broken away, taken along line 20—20 of Figure 19;

Figure 21 is a view of the forward portion of the crimping head taken along line 21—21 of Figure 19, and particularly showing the insulation crimping dies;

Figure 22 is a vertical section of the tool shown in Figure 10, showing the plunger actuating linkage and its mode of attachment to the plunger;

Figure 23 is a horizontal section taken along line 23—23 of Figure 22 showing further details of the plunger actuating linkage;

Figure 24 is a vertical section taken along line 24—24 of Figure 11, showing particularly the plunger dies; and Figure 25 is a vertical section taken along line 25—25 of Figure 11, showing particularly the crimping head dies.

Figures 1, 2:
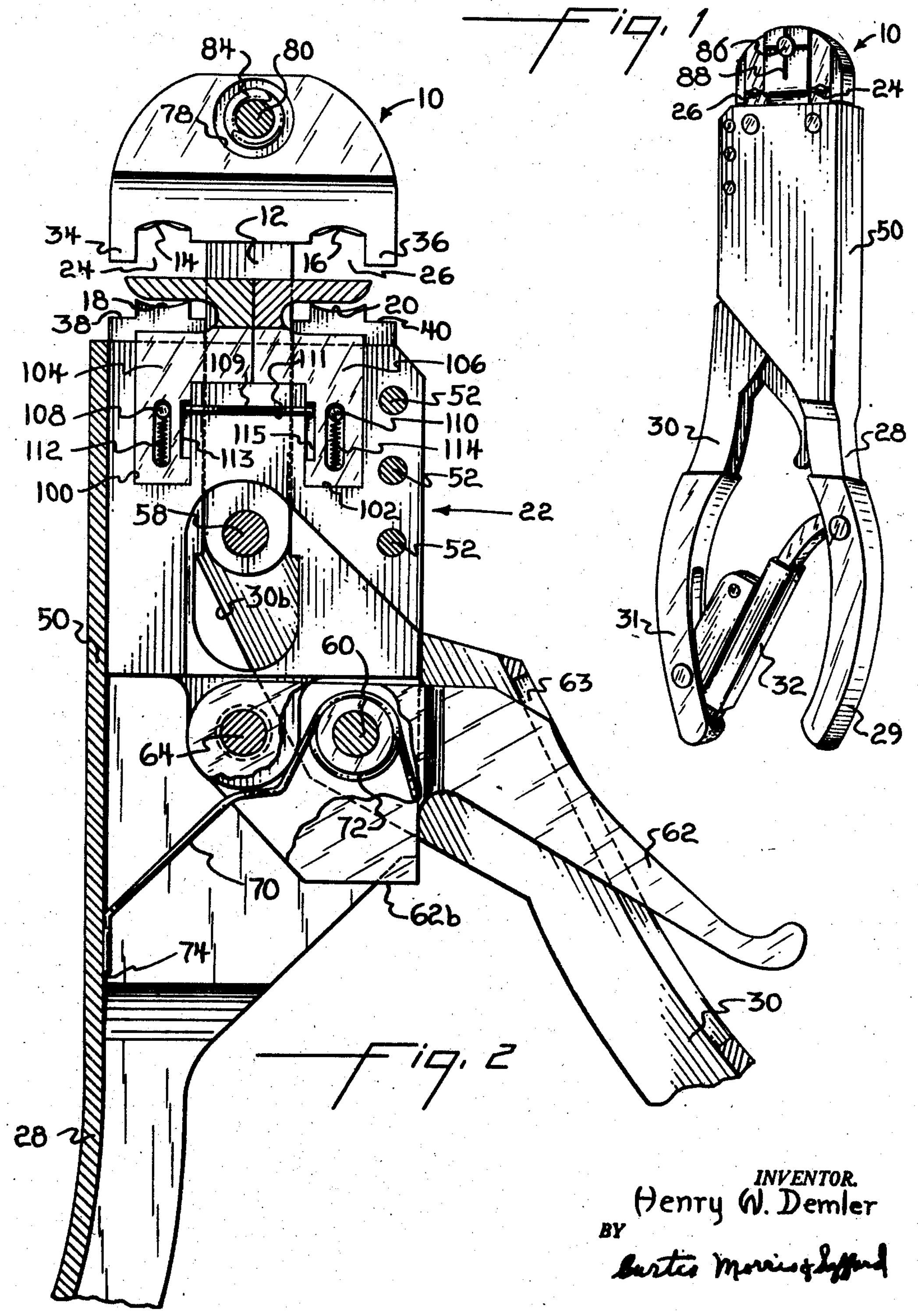
Figure 1 is a perspective view of a hand tool constructed in accordance with the present invention and shown in closed position.
Figure 2 is a vertical section of the hand tool of Figure 1, partly broken away to show details of the operating linkage.

To assist in picturing the operation of the hand tools to be described in detail hereinbelow, a brief overall description will first be presented. Referring now to Figures 1 and 2, the tool shown there includes a generally T-shaped crimping head 10 having a central leg 12 arranged for vertical reciprocating motion. On each side of the central leg, the laterally-extending arms of the crimping head are formed on the under surfaces thereof with crimping dies 14 and 16 adapted to cooperate, respectively, with oppositely-located crimping dies 18 and 20 secured to a die-support member generally indicated at 22. These opposing sets of criming dies form two separate connector chambers 24 and 26 into either of which the connector to be crimped may be inserted when the tool is in its open position as shown in Figure 2.

A pair of manually operable handles 28 and 30 are interconnected with the die-support member 22 and the crimping head 10 by means of a linkage mechanism shown in the cut-away portion of Figure 2, and are arranged in such a manner that the closure of these handles draws the crimping head down toward the die-support member to compress a connector positioned in either one of the chambers 24 and 26. Connected between the handles is a ratchet mechanism 32 of known type (e.g. U.S. Patent 2,618,993) and which is arranged to assure that the tool is closed completely during the compression cycle and opened fully during the reverse cycle of operation. By employing different-sized sets of dies in each of the connector chambers, the tool advantageously is adapted to accommodate a wide range of connector sizes.

During a typical crimping operation, with a connector in one of the chambers there is a tendency for the crimping head 10 to "tilt" or elastically deform away from the connector being crimped because of the extremely high pressures that are applied. In a conventional "one-sided" crimping tool, this misalignment of the crimping dies has represented a serious problem, partly because the die sets do not fully close thereby resulting in an incomplete crimp, but also because the extent and therefore the quality of the crimp is variable, being dependent upon the size of the connector, its resistance to pressure deformation, etc. Also, continued use of such a tool tends to permanently deform elements of the tool. Attempts have been made to minimize this problem by making the load-bearing elements relatively large in size and of heavy-gauge materials which have a high resistance to temporary or permanent stress distortion. However, such tools have not been fully satisfactory commercially, and furthermore the increased weight of the tool makes it more difficult to handle.

It has been found that this problem may be solved in a simple manner by using the "balanced" T-shaped crimping head arrangement described briefly above. The crimping head and other load-bearing members may be small in size to improve the tool handleability, without introducing any unreliability in the quality of the crimp because the crimping dies are automatically realigned at the termination of each crimping stroke.

During the early stages of a crimping operation, the head 10 will, as in a "one-sided" arrangement, tend to tilt or deform away from the connector being compressed. Toward the end of the stroke, however, the crimping head arm associated with the unoccupied connector chamber, i.e. the arm that has been deformed or bent toward the die support member 22 by the high pressures applied, makes contact with the upper surface of the die support member. This contact takes place between one of the side flanges 34 or 36 of the crimping head and the oppositely-located corresponding flat surface 38 or 40 of the die member.

As the crimping stroke is completed, the downward force applied to the central leg 12 will, in effect, rotate the crimping head 10 about this region of contact and thereby forcibly realign the head and its associated crimping dies in their proper positions relative to the corresponding dies of the die-support member. At the termination of a crimping stroke, the spacing between the oppositely-located crimping dies will be essentially the same as though there were no connector in one of the chambers. Thus the resulting crimps will always be complete, uniform and consistent, and substantially independent of the size or toughness of the connector.

Figure 3:
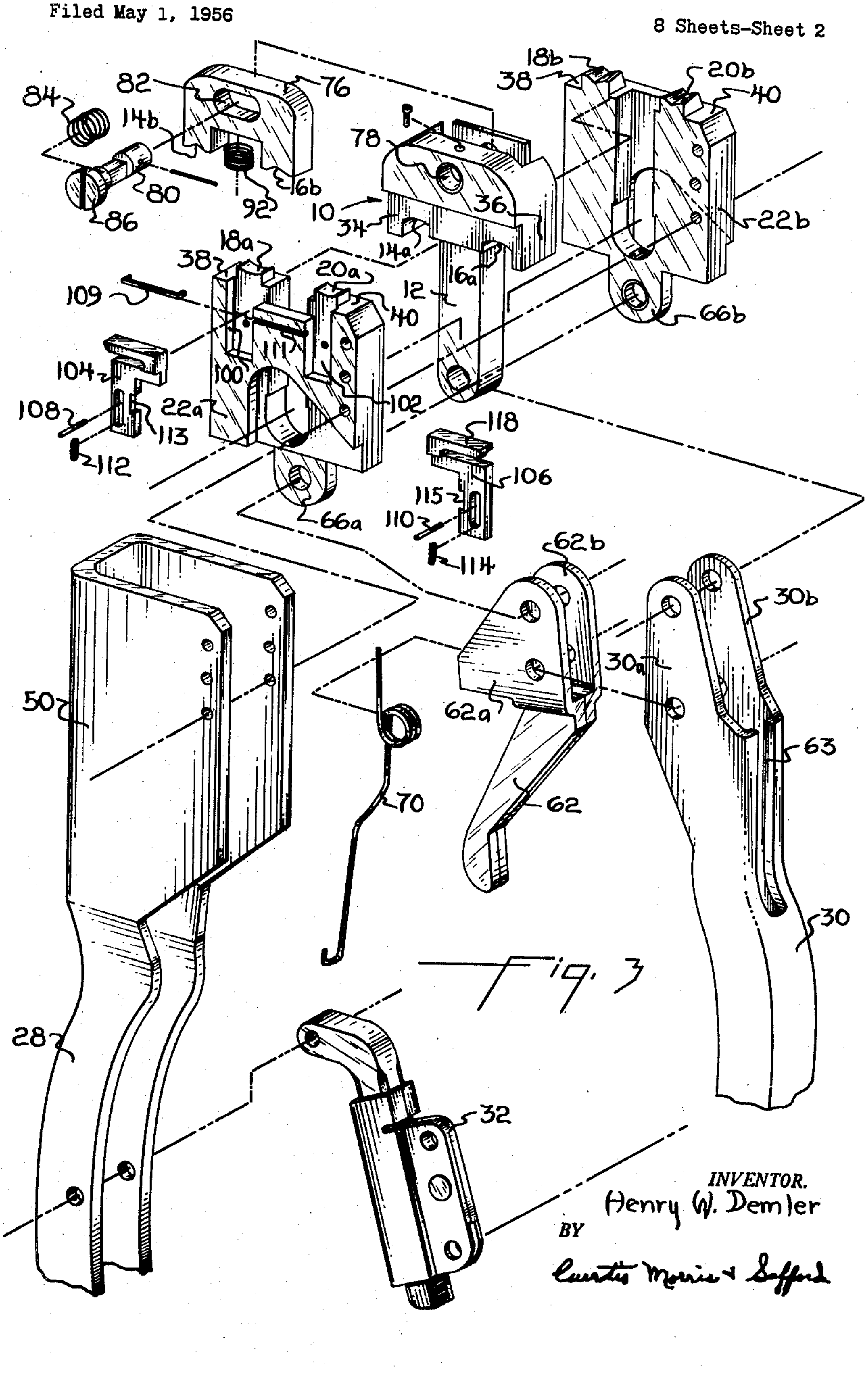
Figure 3 is an exploded view showing the relationship between principal components of the hand tool of Figure 1.

Referring now in detail to Figures 2 and 3, the tool includes an outer housing 50, the lower extremity of which is formed into the fixed handle 28, suitably curved to fit comfortably in the hand of the user. The housing 50 including the handle 28 is generally U shaped in cross-section, and the channel formed by this construction contains the principal operating linkages and other elements to be described below.

The die-support member 22 is composed of two mating blocks **22*a* and 22*b* (see Figure 4) which are positioned together within the U-shaped channel of the housing 50 and are secured to this housing by three pins 52** (Figure 2). These pins extend entirely through the housing and die-support member, and may be retained in place by close frictional engagement with the corresponding bores. The die-support member is made in two parts for ease in manufacture but serves as an integral unit within the tool and could, of course, be made as a one-piece component if desired.

The die-support blocks **22*a* and 22*b* when mated together (see also Figure 4) form a vertical interior passageway 23 the side walls of which form a trackway to guide the central leg 12 of the crimping head 10** during its reciprocating motion. It may particularly be noted that this guiding action need not be precise, because of the automatic realignment feature described above, and hence the manufacturing problem is simplified due to the wider dimensional tolerances that may be applied.

The lower end of the central leg 12 is pivotally secured to the inner end of the movable handle 30 by means of a pin 58 which serves as a travelling pivot for the operating linkage to be described. Each of the handles 28 and 30 (see Figure 1) is provided with an outer plastic cover 29 and 31 serving as insulated hand grips.

Referring now to Figure 3, the pivoted end of the movable handle 30 is formed into two forked arms **30*a* and 30*b* which embrace the lower end of the central leg 12 and through which the pivot pin 58 extends. These handle arms also embrace and are pivotally secured, by means of a drive pin 60 which serves as a rotating pivot, to a pair of ears 62*a* and 62*b* forming part of a trigger linkage 62 the operating arm of which is movable through a slot 63 in handle 30. The upper ends of these ears are, in turn, pivotally secured by means of an anchor pin 64, which serves as a fixed pivot, to a pair of lugs 66*a* and 66*b* integral with and extending downwardly from the die-support blocks 22*a* and 22*b*** respectively.

It can readily be appreciated that when the tool is in open position as in Figure 2, manpulation of the trigger 62 in a clockwise direction about the anchor pin 64 will cause the drive pin 60 to move downwardly and inwardly toward the center of the tool. This motion of the drive pin 60 will tend to rotate the movable handle 30 in a clockwise direction about the pivot pin 58, and at the same time pull the central leg 12 of the crimping head 10 downwardly with respect to the die-support member 22. This initial movement of the crimping head provides a quick take-up means for bringing the dies into crimping position, i.e. into contact with a connector properly positioned within one of the connector chambers, without resulting in more than a slight rotation of the movable handle 30. Further clockwise rotation of the movable handle 30 by manual operation thereof urges the crimping head against the connector with great compressive strength as the stroke is completed. With the trigger arrangement described, substantially the full stroke of the handles is available for applying crimping pressure so that a high mechanical advantage is obtained during this latter stage of the crimping cycle.

In operation, the tool normally will be held in the right hand (although it is equally operable by the left hand) in such a manner that the fixed handle 28 rests against the palm and the movable handle 30 is enclosed by the fingers. In this position, the curved tip of the trigger linkage 62 may be engaged by the index finger, leaving the other three fingers free to grip the movable handle. A connector or terminal of the proper size may then be inserted into one of the chambers 24 or 26 with the left hand, which is not employed in operating the tool. By exerting a slight pressure on the trigger 62 with the index finger of the right hand to rotate the trigger in a clockwise direction, the crimping head will be caused to move towards contact with the connector. This pressure normally will be maintained until the trigger is approximately aligned with the movable handle 30, at which time the ratchet mechanism 32 will have become engaged and the crimping head will have made contact, or nearly so, with the connector.

When the tool is in this position, the driving pin 60 (referring now to Figure 2) will be located a substantial distance below the anchor pin 64. Therefore, the application of a closing pressure to the two handles 28 and 30 will produce a substantial component of force tending to continue the rotation of the trigger 62 in a clockwise direction. The consequent continued clockwise rotation of the drive pin 60 produces a downward motion of the movable handle 30 and the central leg 12 pivotally secured thereto. The closing pressure is continued until the crimp has been completed, i.e. until the ratchet 32 has reached the end of its travel and becomes disengaged to permit the handles again to be opened. When the crimp has been completed, the tip of the trigger linkage 62 will have moved to a position adjacent the fixed handle 28, as shown in Figure 1.

The linkage mechanism described above also is advantageous in preventing the operator from atempting to crimp a connector too large in diameter to be crimped properly in the tool. That is, if a considerably oversized connector is inserted into one of the chambers 24 or 26, it will not be possible to rotate the trigger 62 to the position where a closing pressure applied to the handles will cause continued rotation of the trigger. Therefore, the handles cannot be closed, and the tool is "locked" in its open position without any engagement of the ratchet 32. In this situation, the operator readily may remove the oversized connector and replace it with one having proper dimensions.

To assist in returning the tool to its open position after a crimping operation, a spring 70 is wound around the drive pin 60 (see particularly Figure 2). The right-hand end of this spring bears against the interior surface 72 of the trigger linkage 62, where the ears **62*a* and 62*b* thereof are conjoined. The other end of the spring extends downwardly and its terminus bears against the interior surface of the fixed handle 28 in the region designated 74. When the tool is in closed position, this spring exerts a force between the fixed handle 32 and the trigger linkage 62 tending to rotate the latter (and therefore the movable handle 30**) in a counterclockwise direction, so as to disengage the crimping dies from the connector as well as to return the trigger linkage to its normal open position in an expeditious manner.

Figures 4, 5, 6, 7:
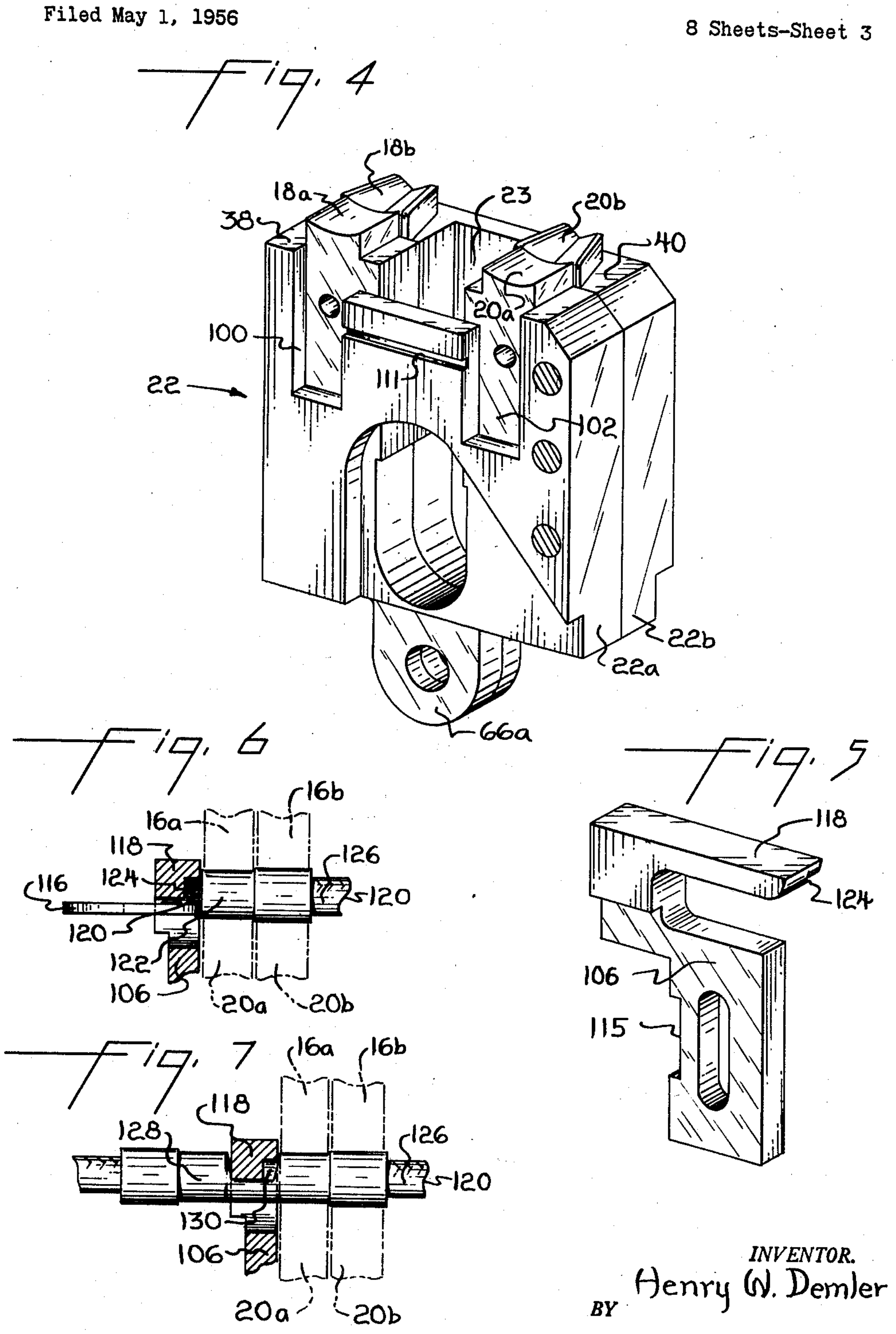
Figure 4 is a perspective view of the die-support member of the hand tool of Figure 1.
Figure 5 is a perspective view of a connector-positioning slide.
Figure 6 is a detail view of a terminal held in position by the connector-positioning slide.
Figure 7 is a detail view of a connector held in position by the connector-positioning slide.

Reverting again to the constructional aspects of this embodiment, Figure 4 shows most clearly the detailed arrangement of the die-support member 22. This member is formed on its upper surface with a pair of connection crimping dies **18*a* and 20*a* each positioned immediately adjacent one of a corresponding pair of insulation crimping dies 18*b* and 20*b*. The connection crimping dies are designed to pressure-form one portion of a connector, in a more or less cold-forging operation, directly to the bared portion of a conductor inserted into the interior of the connector before the crimping operation is performed. The insulation crimping dies are designed to compress another portion of the connector, or the insulating layer commonly associated with such a connector, into intimate contact with the insulation surrounding the conductor, e.g. to form a moistureproof seal (see Figure 15). The dies 18*a* and 18*b* have a larger effective contact area than the other dies 20*a* and 20*b***, so that a wider range of wire sizes may be accommodated by a single tool. In actual usage, only one of these die sets will normally be employed at a time, the choice depending upon the dimensions of the connector or terminal being crimped.

Figure 8:
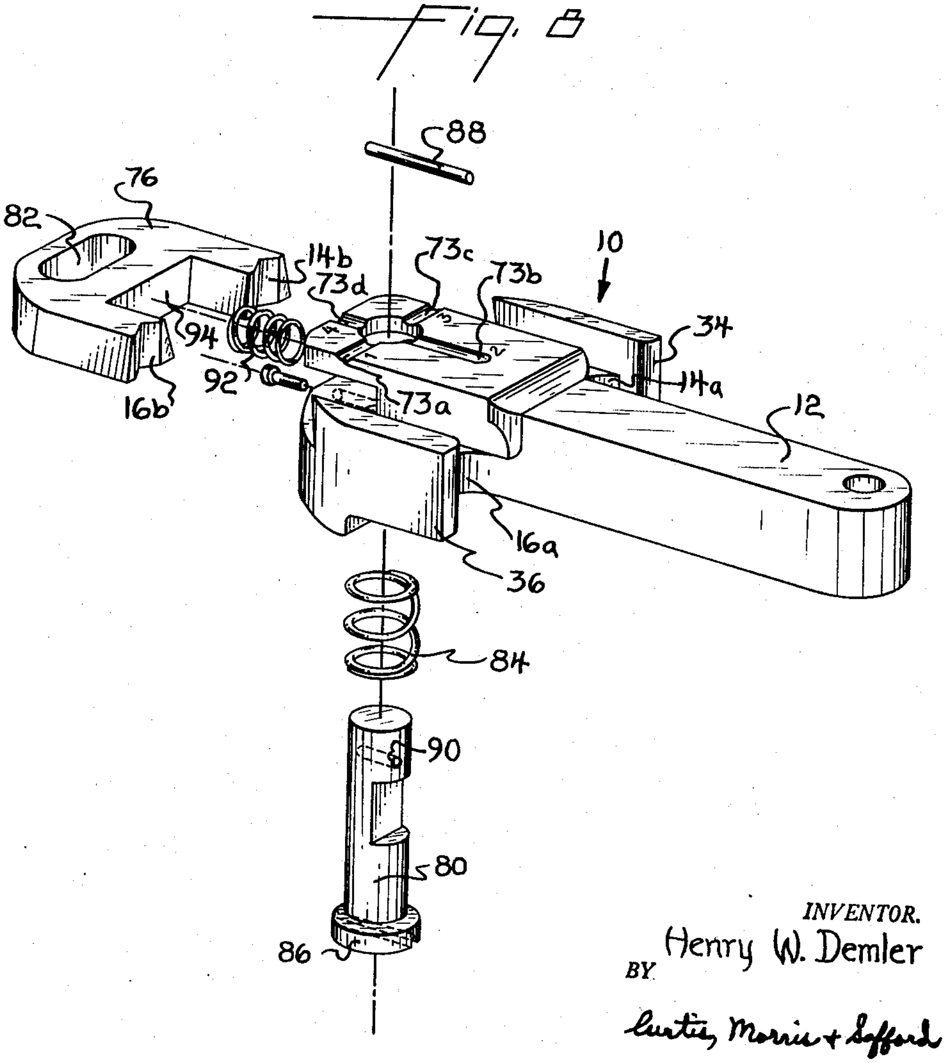
Figure 8 is an exploded view of the crimping head for the hand tool of Figure 1, particularly showing the die-spacing adjustment mechanism.

Referring now to Figure 3 as well as to Figure 8, the crimping head 10 is formed with a pair of connection crimping dies **14*a* and 16*a* which comprise arch-like recesses on opposite sides of the central leg 12. These recesses cooperate, respectively, with the connection crimping dies 18*a* and 20*a* on the die-support member 22 and serve to confine the body of the connector during the application of crimping pressure thereto. The crimping head also includes a semi-fixed jaw member 76 which is slidable within corresponding grooves formed in the head. The inner pronged terminus of this jaw member carries a pair of insulation crimping dies 14*b* and 16*b* which cooperate, respectively, with the corresponding crimping dies 18*b* and 20*b* on the die-support member 22**.

The upper central portion of the crimping head 10 is provided with a transverse bore 78, and a shaft 80 extends through this bore and through an oval slot 82 formed in the jaw member 76. A spring 84, coiled around the shaft 80 between the slotted end 86 thereof and the crimping head 10, urges the shaft away from the head. A pin 88 extends through a small bore 90 passing transversely through the shaft on the opposite side of the head to hold the shaft 80 yieldably in place. The jaw member 76 is urged outwardly away from the die-support member 22 and into contact with the shaft 80 by means of a small coil spring 92 (depicted by an arrow in Figures 9A–D) which presses against the central portion 94 of this jaw member between the crimping dies **14*b* and 16*b***.

As may be seen in Figures 3 and 9, the shaft 80 is formed, in the region where it passes through the oval slot 82 in the jaw member 76, with three flat surfaces and one curved surface each of which is a different distance from the center of the shaft. Since the jaw member bears against this shaft under the urging of spring 92, rotation of the shaft will provide, because of the "differential" surface arrangement, a camming action which adjusts the position of the semi-fixed jaw member. Figure 9A shows the jaw member in engagement with the curved surface of the shaft, which represents the position where the jaw member is closest to the die-support member 22. Figures 9B, 9C and 9D show, respectively, the jaw member in engagement with the three flat surfaces of the shaft and demonstrate how the relative positioning of the jaw member varies accordingly. In the embodiment described herein, the dimensions of the shaft are such that the positioning of the jaw member changes approximately .02 inch for each adjustment step.

Referring again to Figure 8, as well as to Figure 1, a lock detent arrangement is provided for this adjustment, and comprises a series of four grooves **73*a*, *b*, *c* and *d* (indexed 1 through 4) formed in one side of the crimping head 10 to receive and hold the pin 88** in any one of four corresponding positions. To make a change in adjustment, it is only necessary to press the shaft end 86 toward the crimping head as by means of a screwdriver, a distance sufficient to lift the pin 88 out of the groove it then rests in; the shaft then may be rotated to the proper setting, and released to permit it to snap back into normal position under urging of the spring 84. The pin 88 accordingly will drop into a new groove, so that the shaft 80 is firmly locked in a new position with the jaw member 76 adjusted in a positive manner to the desired setting. This adjusts the setting of the insulation crimping dies 14*b*, 16*b* to compensate for the thickness of the insulation on the conductor.

Another feature of the tool is the provision of means for positioning connectors, terminals, etc. in the chambers 24 and 26 in such a way that the applied crimp is accurately located. For this purpose, referring now to Figures 2 and 3, one die-support block 22*a* is formed with a pair of vertical grooves 100 and 102 within which are fitted, respectively, the upright legs of a pair of corresponding connector positioning slides 104 and 106 (see also Figure 5) arranged generally in an inverted L-shape. Each of these slides is provided with a vertical slot through which extends a corresponding pin 108 and 110 secured to the die-support block 22*a*. Small springs 112 and 114 are positioned in these slots and abutting the pins 108 and 110 to urge the slides downwardly into seating engagement with the bottoms of the grooves 100 and 102. A rod 109 is seated in a transverse groove 111 formed in the die support block 22*a*, and its ends extend into corresponding recesses 113 and 115 in the sides of the slide to limit upward movement thereof. The slides are confined within the vertical grooves 100 and 102 by one side wall of the housing 50.

Figure 6 shows a terminal held in proper position for crimping by one of the above-described slides 106. Here it can be seen that the barrel 122 of the terminal abuts the cross-arm 118 of the slide while tongue 116 of the terminal extends out under the cross-arm to locate the terminal in proper crimping position. The bare end of a wire 120, which passes through the terminal barrel 122, abuts a cut-back portion 124 of this cross-arm. With the terminal and wire so positioned, the crimping dies 16*a*, 16*b*, 20*a* and 20*b* will produce an accurate and proper crimp of the connector barrel to the bared portion of the wire, and also to the insulating layer 126 of the wire. The vertical adjustability of the slide 106, as will be apparent, permits it to accommodate terminals of various sizes and serves to positively grip and hold the terminal prior to a crimping operation.

Figure 7 shows the slide 106 used to maintain a connector 128 in proper position for crimping. Here the cross-arm 118 of the slide is seated, under spring tension, down in a recess 130 formed in the center of the connector; this recess advantageously has tapered sides as shown to assure proper centering action.

The embodiment of the invention shown in Figures 10 through 25 differs from the embodiment of Figure 1 particularly in that the balanced T-shaped crimping head is fixed in position relative to the main housing of the tool, rather than being movable with respect thereto, and the closing movement of the operating handles drives a die-supporting plunger in the interior of the tool housing towards the laterally-extending arms of the crimping head. Referring now in detail to Figures 10 through 13, this embodiment includes an outer housing 150 forming a channel which is U-shaped in cross-section and integral with a fixed handle 152. Secured to this housing is a T-shaped crimping head, generally indicated at 154, and including a central leg 156 supported by a body portion 158 which is fastened by three pins 160 to the housing.

Referring now to Figures 16 and 17, the crimping head 154 is provided with an internal passage 162 extending longitudinally therethrough. Slidable within this passage is a plunger 164 (best shown in Figures 13 and 22), which serves as a die-support member. A slot 166 is formed longitudinally along the center line of the plunger and a pin 168 extending through this slot limits rearward motion of the plunger, i.e. motion to the right in Figure 22. This pin is held in place by engagement with two holes 170 and 172 on opposite sides of the crimping head 154 (Figures 16 and 17).

Referring again to Figure 11, pivotally secured to the pin 168 is a movable handle 174, the inner pivoted end of which is formed (see also Figure 23) into two forked arms 174*a* and 174*b* embracing the plunger 164. As shown in Figure 13, the plunger is recessed at 176 to receive these forked arms, the outer surfaces of which are flush with the sides of the plunger.

Reverting to Figure 11, the right-hand end of the plunger 164 is pivotally secured by means of a drive pin 178 to the inner end of a trigger linkage 180. This trigger linkage also is pivotally connected, near the central portion thereof, to the movable handle 174 by means of a pivot pin 182. Referring to Figure 23, the inner end of the trigger linkage, i.e. in the region where it joins the plunger, comprises two forked members 180*a* and 180*b* fitting within the forked arms 174*a* and 174*b* of the movable handle, and which extend around and on opposite sides of the lug 184 extending rearwardly from the plunger.

When the tool is in open position as in Figure 11, manipulation of the trigger linkage 180 in a counterclockwise direction about the pivot pin 182 will drive the plunger 164 along a rectilinear path in a direction to close the forward end of the plunger (i.e. the end away from the driving pin 178), against a connector or terminal positioned in one of the connector chambers 186 or 188 located on opposite sides of the central leg 156 of the crimping head 154.

A typical terminal adapted to be crimped in such a tool is shown in Figures 14 and 15 to demonstrate the nature of the crimping function. This terminal includes a tongue 190, adapted to be secured to a binding post, and a barrel portion 192. An insulated conductor 194 has its insulation stripped away from a portion thereof to form a bare end 196, and is inserted in the barrel portion. In Figure 15, the barrel is shown crimped at two points 198 and 200, and is similarly crimped at two points (not shown) on the opposite side of the barrel. The first crimp 198 provides a connection between the terminal and the barrel end 196, and the second crimp 200 seals the terminal to the insulation of the conductor.

Referring again to Figures 11 and 22, a spring 202 is wound around the pivot pin 182 to return the tool to its open position after a crimping operation. One end of this spring bears against an interior surface 204 of the trigger linkage 180 where the forked members 180*a* and 180*b* conjoin, while the other end bears against the interior surface of the fixed handle 152 in the region designated 206.

Figure 24 shows the dies formed on the forward end of the plunger 164. These include a pair of insulation crmping dies 208 and 210 and a pair of connection crimping dies 212 and 214. Figure 25 shows the dies associated with the crimping head 154, including a pair of insulation crimping dies 208*a* and 210*a* and a pair of connection crimping dies 212*a* and 214*a*. As described with reference to the Figure 1 embodiment, the dies on the head and on the plunger cooperate to form corresponding die-sets for crimping a connector or terminal, etc.

As shown in Figures 18 and 21, the crimping head 154 is provided with two grooves 224 and 226 within which is slidably positioned a semi-fixed jaw member 228 (Figure 13) carrying the insulation crimping dies 208*a* and 210*a*. Referring to Figures 20 and 23, the central portion of the crimping head is formed with a longitudinal bore 230 containing a spring 232 urging the jaw member away from the plunger 164. Extending through a transverse bore 234 in the head is a shaft 236 which also passes through an oval slot 238 (Figure 22) formed in the jaw member 228, thereby serving to hold the jaw member in place against the crimping pressure applied by the plunger. A knurled knob 240 is secured to one end of this shaft and is spring-loaded away from the head by a spring 242. As in the Figure 1 embodiment, this shaft is formed with three flat surfaces and one curved surface to provide a camming action for adjusting the position of the semi-fixed jaw member. Also, as shown in Figure 10, a locking detent arrangement is provided for this adjustment including a pin 244 arranged to rest in one of four grooves (numbered 1 through 4) formed in the crimping head.

Referring now to Figures 12, 13, 17 and 22, a pair of connector positioning slides 248 and 250 are slidable in a corresponding pair of grooves 252 formed in the interior of the body portion 158. One end of each slide extends into a respective one of the connector chambers 186 and 188, and is urged towards such chamber by a small hair spring 254 and 256, respectively, which is retained in place by the housing 150 on one side and the slide on the other. The ends of each spring are flared out to bear against adjacent ledges 258 and 260 on the slides, and against cut-out surfaces 262 and 264 in the crimping head (see also Figure 16). Longitudinal motion of the slides is limited by two pins (not shown) which extend through slots 266 and 268, respectively, in the slides, and which are firmly held within two holes 270 and 272 formed in one side wall of the crimping head body portion 158.

The motion of the slides 248 and 250 is controlled by a positioning lever 274 extending out through a slot in one side of the tool and which is pivoted about a pin 276 centrally located between the two slides and secured to the housing 150. These slides serve to properly position connectors and terminals within the connector chambers 186 and 188 in a manner described in detail in my above-mentioned copending application Serial No. 399,978.

From the foregoing description, it will be apparent that crimping tools incorporating the present invention are capable of achieving the several objects set forth at the beginning of the present specification. For example, the construction described herein is particularly advantageous in assuring an accurate and complete crimp each time, since the structural distortions typically encountered at the termination of a crimping stroke are eliminated or greatly minimized by virtue of the automatic realignment feature stemming from the balanced application of crimping force to both arms of the T-shaped head. Further, the dual connector chamber arrangement provided by the T-shaped construction of the crimping head, as well as the adjustable crimping jaw described, extends considerably the range of connector and terminal sizes that may be handled by one tool; it being possible in most applications, for example, to accommodate all of the connector size requirements with only one hand tool without changing the crimping dies.

It is of course to be understood that the foregoing description is illustrative only and that numerous changes apparent to those skilled in the art can be made in the tool constructions described above without departing from the spirit of the invention.

I claim:

1. A tool for crimping electrical connectors comprising, in combination, a crimping head having a central leg and first and second arms extending laterally away from opposite sides of said leg, a crimping die on said first arm, a die support member associated with said head, said member having first and second portions located respectively adjacent said opposite sides of said leg, said first portion having a second crimping die arranged to cooperate with said first die as a die set, and operating means interconnected with said crimping head and said die support member and operable to produce relative motion parallel to the axis of said leg to crimp a connector placed in said die set, said second arm having an element thereof arranged to abut against said second portion of said die support member when the end of a crimping operation is reached whereby said crimping head is positively aligned to its proper position with respect to the die support member.

2. A tool for crimping electrical connectors comprising, in combination, a die support member, a crimping head having a central leg slidably mounted with respect to said member and first and second arms extending laterally away from opposite sides of said leg, a crimping die on said first arm, said member having first and second portions located respectively adjacent said opposite sides of said leg, said first portion having a second crimping die arranged to cooperate with said first die as a die set, operating means interconnected with said crimping head and said die support member and operable to slide said head relative to said member to crimp a connector placed therebetween, said head being supported and arranged in such a manner that the reaction to crimping pressures applied by the die set to a connector substantially deflects said head, said second arm having an element thereof arranged to abut against said second portion of said die support member before the end of a crimping operation is reached so that the continuance of said relative motion effects forcible realignment of the crimping head to its proper position with respect to the die support member as the crimping operation proceeds to completion.

3. A tool for crimping electrical connectors comprising, in combination, a crimping head having a central leg and first and second arms extending laterally away from the opposite sides of said legs, a crimping die on said first arm, a die support plunger slidable with respect to said head, said plunger having first and second portions located respectively adjacent said opposite sides of said leg, said first portion having a second crimping die arranged to cooperate with said first die as a die set, operating means interconnected with said crimping head and said plunger and operable to move said plunger to crimp a connector placed therebetween, the reaction to crimping pressures applied by the die set to a connector substantially deflecting said head, said second arm having an element thereof arranged to abut against said second portion of said die support member as the end of a crimping operation approaches so that the continuance of the movement of said plunger effects forcible realignment of the crimping head to its proper position with respect to the plunger as the crimping operation proceeds to completion.

4. A tool as claimed in claim 1, wherein said second arm and said second die support member portion are provided with respective dies so as to form a pair of die sets disposed on opposite sides of said leg, each of said arms having an element arranged, when a connector is being crimped by the die set associated with the other arm, to contact the corresponding portion of said die support member as the end of the crimping operation is reached.

5. A tool as claimed in claim 4, including guiding means for constraining said relative motion to a direction parallel to the longitudinal axis of said leg.

6. A tool as claimed in claim 2, including a main body frame to which said die support member is fixedly secured, and wherein said second arm and said second die support member portion have respective crimping dies to form a pair of die sets disposed on opposite sides of said leg, each of said arms also having an element arranged, when a connector is being crimped by the die set associated with the other arm, to contact the corresponding portion of said member as the end of the crimping operation is reached.

7. A tool as claimed in claim 6, wherein said operating means includes an actuating part secured to said central leg in a region remote from said arms, said part being arranged upon actuation of said operating means to apply a driving force to said leg having a component that is normal to the axis of said leg and generally parallel to the direction of said laterally extending first arm, the die set formed by the die on said first arm being smaller than the other die set.

8. A tool as claimed in claim 6, wherein said elements comprise flanges on the remote ends of said arms and protruding towards said die support member.

9. A tool as claimed in claim 6, wherein said die support member comprises a pair of parallel parts with a connecting piece at one end to form a generally U-shaped member, the free ends of said parts supporting said dies, said central leg and said arms forming a generally T-shaped structure with the central leg thereof slidably disposed within the interior of said U-shaped member and between the parallel parts thereof.

10. A tool for crimping electrical connectors comprising, in combination, a crimping head having a central leg and first and second arms extending laterally away from opposite sides of said legs, a crimping die on said first arm, a die support member associated with said head, said member and said head being arranged for relative movement therebetween parallel to the longitudinal axis of said leg, said member having a portoin located adjacent said first arm and along one side of said leg, a second crimping die on said portion arranged to cooperate with said first die as a die set, operating means interconnected with said crimping head and said die support member and operable to produce said relative movement to crimp a connector placed therebetween, and head alignment means joined with said die support member and located adjacent the side of said central leg that is opposite said one side, said alignment means being arranged by actuation of said operating means to apply a force to said second arm in a direction parallel to the axis of said central leg during the crimping operation whereby said crimping head is positively aligned to its proper position with respect to the die support member when the end of the crimping operation has been reached.

References Cited in the file of this patent

UNITED STATES PATENTS

| | | |
|---|---|---|
| 495,793 | Fletcher | Apr. 18, 1893 |
| 1,058,625 | Pepper | Apr. 8, 1913 |
| 1,195,065 | Morrow | Aug. 15, 1916 |
| 1,475,273 | Bernard | Nov. 27, 1923 |
| 2,054,973 | Ferguson | Sept. 22, 1936 |
| 2,359,083 | Carlson | Sept. 26, 1944 |

FOREIGN PATENTS

| | | |
|---|---|---|
| 80,564 | Switzerland | Mar. 17, 1919 |
| 138,347 | Great Britain | June 17, 1920 |
| 953,249 | France | May 16, 1949 |